US012531040B2

(12) United States Patent
Nagatsuma

(10) Patent No.: US 12,531,040 B2
(45) Date of Patent: Jan. 20, 2026

(54) STAND AND KEYBOARD INSTRUMENT SET

(71) Applicant: CASIO COMPUTER CO., LTD., Tokyo (JP)

(72) Inventor: Shigeyuki Nagatsuma, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 272 days.

(21) Appl. No.: 18/133,818

(22) Filed: Apr. 12, 2023

(65) Prior Publication Data

US 2023/0335088 A1 Oct. 19, 2023

(30) Foreign Application Priority Data

Apr. 14, 2022 (JP) ................................ 2022-066725

(51) Int. Cl.
*G10G 5/00* (2006.01)

(52) U.S. Cl.
CPC .................................... *G10G 5/005* (2013.01)

(58) Field of Classification Search
CPC ................................ G10G 5/005; G10G 5/00
See application file for complete search history.

(56) References Cited

U.S. PATENT DOCUMENTS 7,473,842 B2 * 1/2009 Naito ...................... G10H 1/32
84/718

FOREIGN PATENT DOCUMENTS

| | | | |
|---|---|---|---|
| JP | H03-084878 | A | 4/1991 |
| JP | H03-200396 | A | 9/1991 |
| JP | 3182648 | U | 4/2013 |
| JP | 2016-507778 | A | 3/2016 |
| WO | 2017072974 | A1 | 5/2017 |

OTHER PUBLICATIONS

JPO; Application No. 2022-066725; Notice of Reasons for Refusal dated Mar. 5, 2024.

* cited by examiner

*Primary Examiner* — Kimberly R Lockett
(74) *Attorney, Agent, or Firm* — Fitch, Even, Tabin & Flannery LLP

(57) ABSTRACT

A stand includes a lateral spanning member, a connecting member configured to be fixed to the lateral spanning member and having a first engagement portion and a second engagement portion, and a front leg comprising a first engagement target portion configured to be brought into engagement with the first engagement portion and a back leg comprising a second engagement target portion configured to be brought into engagement with the second engagement portion, and a first engagement construction in which the first engagement target portion is brought into engagement with the first t engagement portion and a second engagement construction in which the second engagement target portion is brought into engagement with the second engagement portion are different from each other.

13 Claims, 10 Drawing Sheets

STAND AND KEYBOARD INSTRUMENT SET

CROSS-REFERENCE TO RELATED APPLICATION

This patent application is based upon and claims the benefit of priority under 35 USC 119 of Japanese Patent Application No. 2022-066725 filed on Apr. 14, 2022, the entire disclosure of which, including the specification, claims, drawings and abstract, is incorporated herein by reference in its entirety.

BACKGROUND

Technical Field

The present disclosure relates to a stand and a keyboard instrument set.

Description of the Related Art

There have conventionally been disclosed stands for attachment to various types of devices. For example, Japanese Utility Model Registration No. 3182648 publicly discloses a stand including four leg members which are configured to be screwed to internally threaded portions provided in a lower surface of an electronic keyboard instrument for attachment thereto.

SUMMARY

According to an aspect of the present disclosure, there is provided a stand including a lateral spanning member, a connecting member configured to be fixed to the lateral spanning member and having a first engagement portion and a second engagement portion, and a front leg including a first engagement target portion configured to be brought into engagement with the first engagement portion and a back leg including a second engagement target portion configured to be brought into engagement with the second engagement portion, wherein a first engagement construction in which the first engagement target portion is brought into engagement with the first engagement portion and a second engagement construction in which the second engagement target portion is brought into engagement with the second engagement portion are different from each other.

According to another aspect of the present disclosure, there is provided a keyboard instrument set including the stand and a keyboard instrument configured to be attached to the stand.

DESCRIPTION OF THE EMBODIMENT

Figure 1:
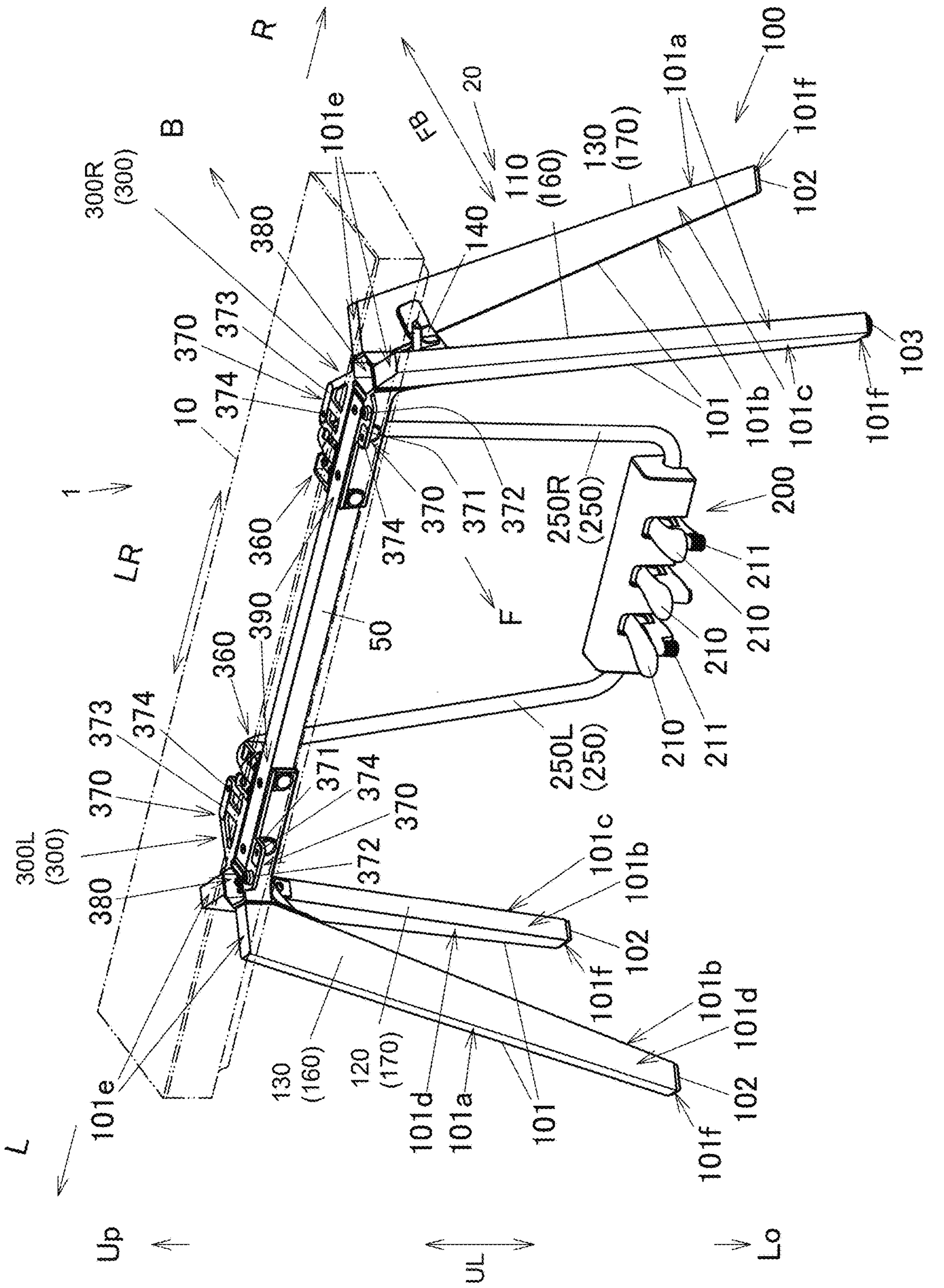
FIG. 1 is a perspective view of a keyboard instrument set including a stand according to an embodiment of the present disclosure, as viewed obliquely downwards from a front upper side.

Hereinafter, an embodiment of the present disclosure will be described based on drawings. FIG. 1 shows a keyboard instrument set 1 including a stand 20 for supporting a keyboard instrument 10 of a substantially rectangular parallelepiped shape, which is shown by chain double-dashed lines. A pedal device 200 including three pedals 210 is provided on the stand 20 of the keyboard instrument set 1. In the following description, a front-back direction of the pedals 210 (a front-back direction of keys, not shown, of the keyboard instrument 10) is referred to as a front-back direction FB. The front to the pedals 210 is referred to as a front side F (a player's side), while the back to the pedals 210 is referred to as a back side B. A direction in which the pedals 210 are aligned (an alignment direction of the keys, not shown, of the keyboard instrument 10) is referred to as a left-right direction LR. Then, when facing the pedal device 200 from the front side F, the left to the pedal device 200 is referred to as a left side L, while the right to the pedal device 200 is referred to as a right side R. In addition, when viewing the pedal device 200 in an upper-lower direction UL thereof, an upper side is referred to as an upper side Up, while a lower side is referred to as a lower side Lo. In the present embodiment, while the keyboard instrument 10 is described as a supporting target of the stand 20, the supporting target may be other musical instruments, various types of devices, and the like.

Figure 2:
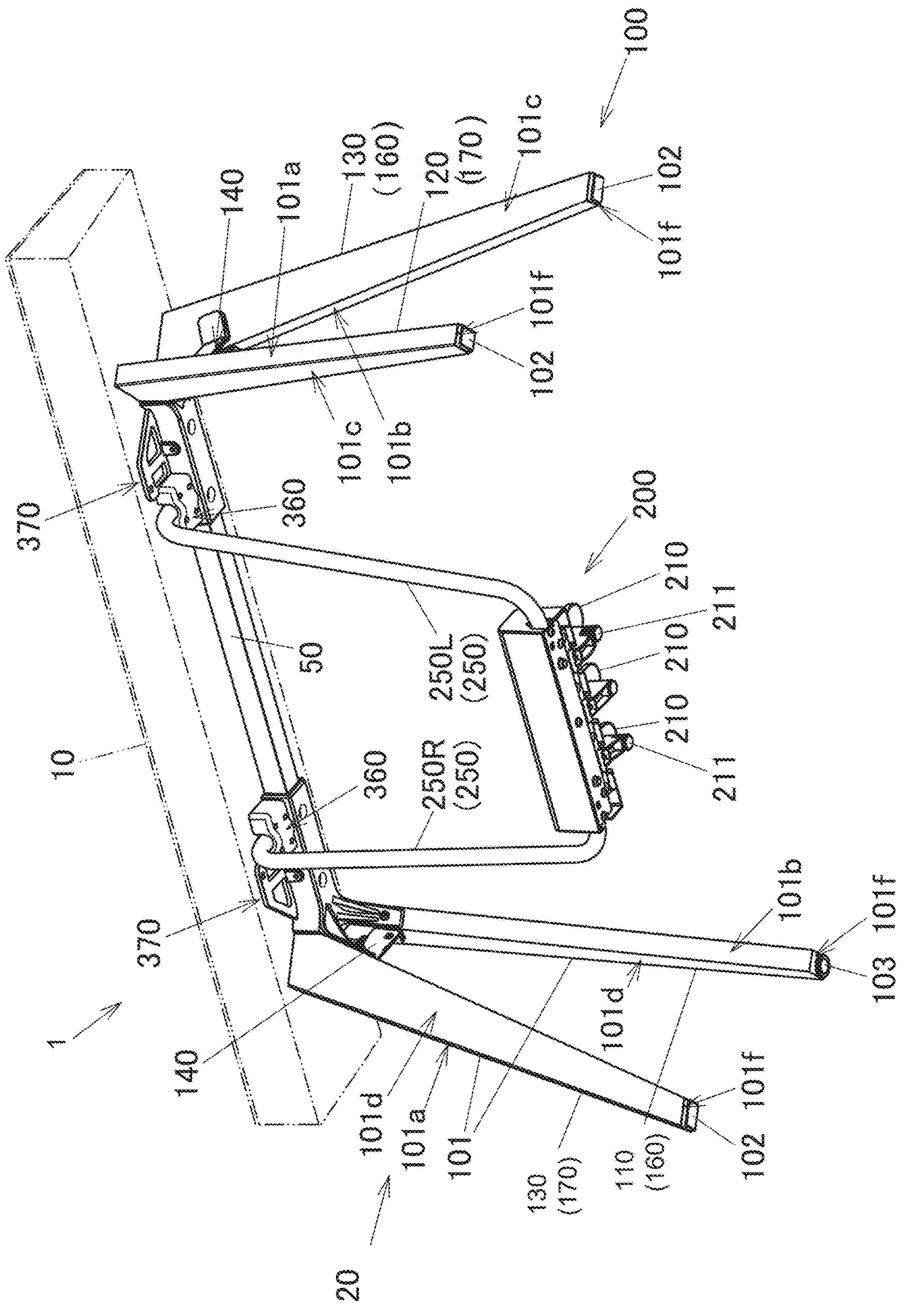
FIG. 2 is a perspective view of the keyboard instrument set including the stand according to the embodiment of the present disclosure, as viewed obliquely upwards from a back lower side.

As shown in FIGS. 1 and 2, the stand 20 includes an angular tube-shaped horizontal spanning member 50 (lateral spanning member), which is elongated in the left-right direction LR, two connecting members 300 which are configured to be provided individually at both end portions of the horizontal spanning member 50 (lateral spanning member), and plural leg members 100 which are configured to be provided on the two connecting members 300, the plural leg members 100 including a first leg member 110, a second leg member 120, and two third leg members. The connecting members 300 include a left connecting member 300L which is configured to be fixed to a left end of the horizontal spanning member 50 and a right connecting member 300R which is configured to be fixed to a right end of the horizontal spanning member 50. The connecting members 300 are each formed from a metallic material such as aluminum or the like through die casting.

With the left connecting member 300L, of the two third leg members, one third leg member 130 is attached to a front side F, and the second leg member 120 is attached to a back side B thereof. An angle brace member 140 is provided between the third leg member 130 and the second leg member 120 in such a manner as to span a space defined therebetween. With the right connecting member 300R, the first leg member 110 is attached to a front side F, and the other third leg member 130 is attached to a back side B thereof. A front leg member 160 includes the first leg member 110 and the third leg member 130 on the front side F. A back leg member 170 includes the second leg member 120 and the third leg member 130 on the back side B. An angle brace member 140 is provided between the first leg member 110 and the third leg member 130 in such a manner as to span a space defined therebetween.

In providing the pedal device 200 on the stand 20, the pedal device 200 is connected to be fixed to pedal frame fixing portions 360 of the connecting members 300 via pedal frames 250 which are each formed by bending a round bar-shaped member. A left pedal frame 250L is connected to be fixed to the left connecting member 300L, and a right pedal frame 250R is connected to be fixed to the right connecting frame 300R. In addition, a setting adjustment member 211 for adjusting an abutment of the pedal device 200 with a setting surface such as a floor on which the pedal device 200 is set is provided on a lower side Lo of a left-end pedal 210 and a lower side Lo of a right-end pedal 210.

An instrument attachment portion 370 is provided on the connecting member 300 in such a manner as to project into a flat plate shape on a front side F and a back side B of the horizontal spanning member 50. An abutment surface 371 and a positioning pin 372 are provided on a front side F of the instrument attachment portion 370. The abutment surface 371 is formed into a flat surface which projects upwards towards the upper side Up from a base plate portion which projects into a flat plate shape. The positioning pin 372 is provided laterally outwards of the abutment surface 371. An abutment surface 373 is provided on a back side B of the instrument attachment portion 370, and this abutment surface 373 is formed into a flat surface which projects upwards towards the upper side Up from a base plate portion which projects into a flat plate shape. The abutment surfaces 371, 373 are brought into abutment with predetermined portions on a lower surface of the keyboard instrument 10 and are then fixed thereto with screw members via screw holes 374 which are provided in the front side F and the back side B of the instrument attachment portion 370.

The horizontal spanning member 50 is placed in a horizontal member fixing portion 390 which is provided on the connecting member 300 into a recessed groove shape so as to be fixed in place therein. The horizontal spanning member 50 is fixed to the horizontal spanning member fixing portion 390 with screw members from the upper-lower direction UL and the front-back direction FB.

Figure 3:
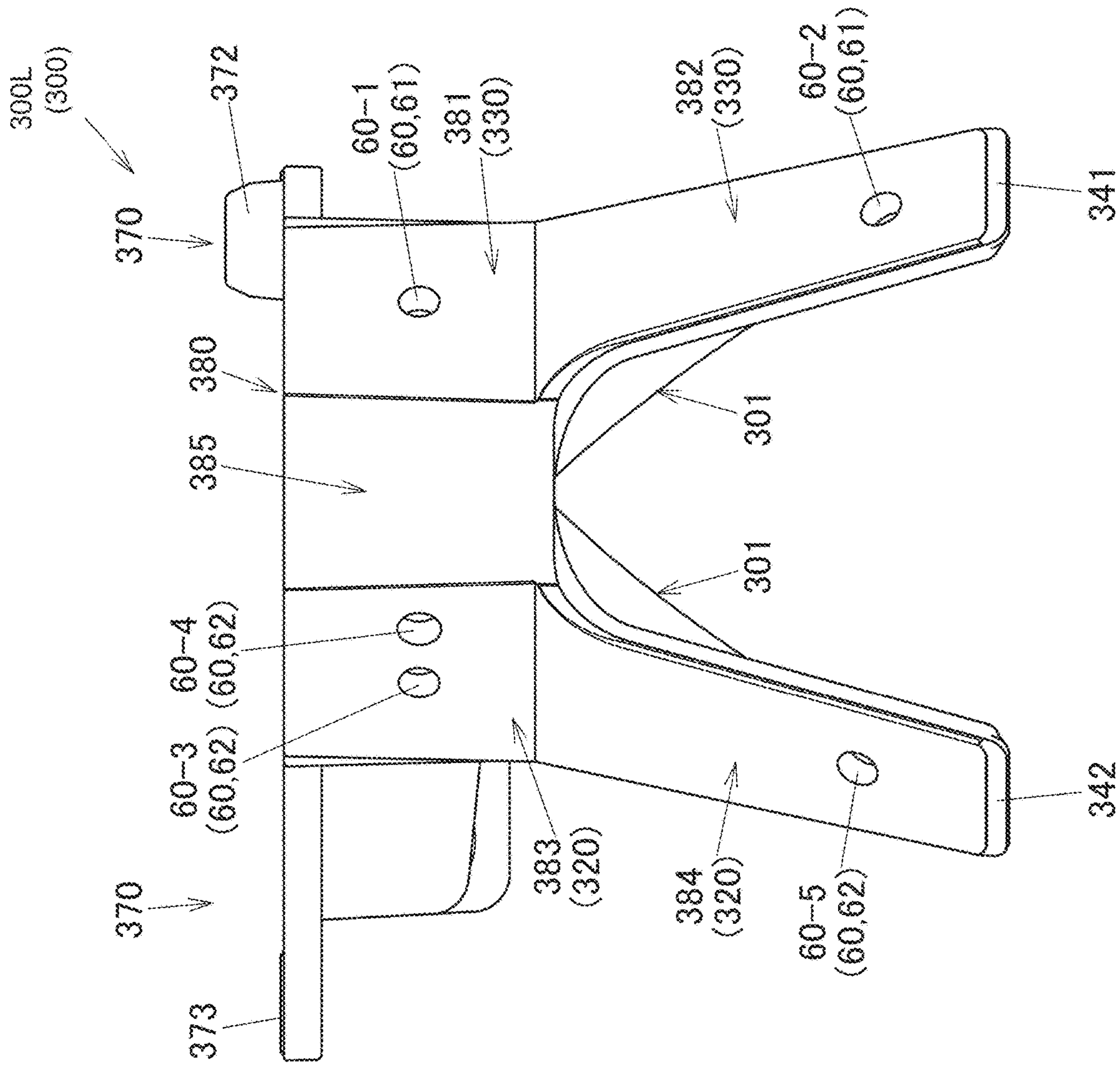
FIG. 3 is a left side view of a left connecting member of the stand according to the embodiment of the present disclosure.
Figure 4:
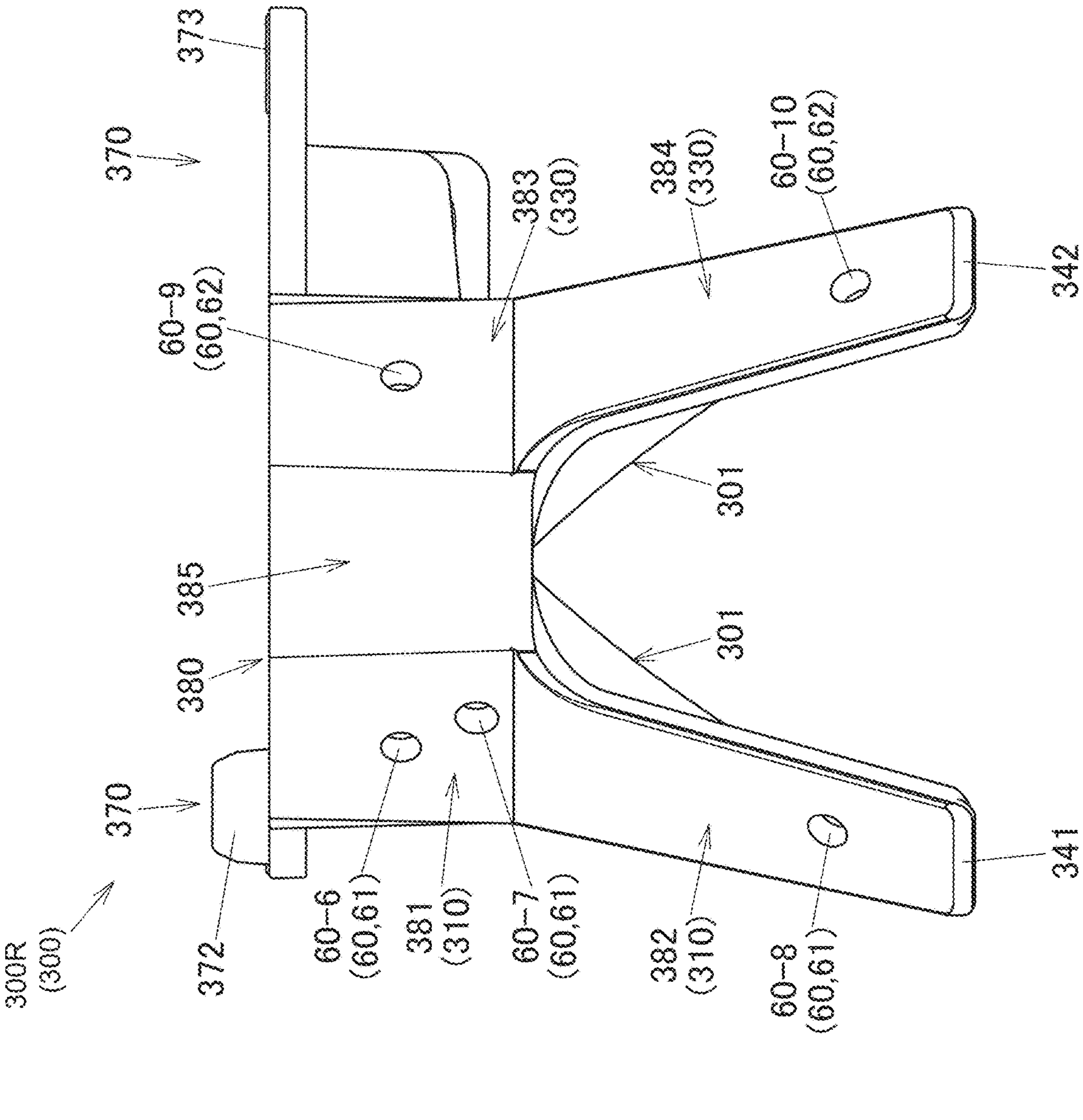
FIG. 4 is a right side view of a right connecting member of the stand according to the embodiment of the present disclosure.

A polygonal portion (an upper leg attachment portion) 380, which is made up of a bottomed substantially hexagonal tubular member, is provided laterally outwards in the left-right direction LR on each of the connecting members 300 (the left connecting member 300L, the right connecting member 300R). As shown in FIGS. 3 and 4, the connecting members 300 each include a front upper attachment surface 381, a front lower attachment surface 382, a back upper attachment surface 383, and a back lower attachment surface 384. In the left connecting member 300L, directions of respective normals of the front upper attachment surface 381, the front lower attachment surface 382, the back upper attachment surface 383, and the back lower attachment surface 384 are set different from one another. Consequently, directions of normals of attachment surfaces of the members which are configured to be attached to the front upper attachment surface 381, the front lower attachment surface 382, the back upper attachment surface 383, and the back lower attachment surface 384 of the left connecting member 300L also become different from one another when the keyboard instrument set 1 is completely build up. In the left connecting member 300L, directions of externally threaded screws or male screws for use in attachments, which will be described, substantially coincide with the directions of the respective normals of the attachment surfaces. In the left connecting member 300L, when an external force is applied thereto from one direction, loads exerted on circumferences of all the male screws are prevented from being maximized by making the directions of the male screws different in the way described above.

The front upper attachment surface 381 and the back upper attachment surface 383 are made into outer surfaces of the polygonal portion 380 and are disposed on a front side F and a back side B of the polygonal portion 380 with their surfaces made parallel to the upper-lower direction UL and the directions of their normals caused to incline substantially at 45 degrees from the front-back direction FB (and the left-right direction LR). The front upper attachment surface 381 and the back upper attachment surface 383 are connected together by a connecting surface 385 which also constitutes an outer surface of the polygonal portion 380, which is parallel to the upper-lower direction UL, and of which a normal is directed laterally outwards in the left-right direction LR.

The connecting member 300 includes extended portions 341, 342 which are extended downwards from a lower side Lo of the polygonal portion 380 in a bifurcate fashion, and the extended portions 341, 342 include the front lower attachment surface 382 and the back lower attachment surface 384, respectively. The front lower attachment surface 382 and the back lower attachment surface 384 connect with the front upper attachment surface 381 and the back upper attachment surface 383, respectively, in such a manner as to be bent outwards from the front upper attachment surface 381 and the back upper attachment surface 383, respectively.

In the left connecting member 300L, a third leg attachment portion 330 to which the third leg member 130 is configured to be attached includes the front upper attachment surface 381 and front lower attachment surface 382. A second leg attachment portion 320 to which the second leg member 120 is configured to be attached includes the back upper attachment surface 383 and the back lower attachment surface 384.

In the right connecting member 300R, a first leg attachment portion 310 to which the first leg member 110 is configured to be attached includes the front upper attachment surface 381 and the front lower attachment surface 382, and a third leg attachment portion 330 includes the back upper attachment surface 383 and the back lower attachment surface 384.

The connecting member 300 includes the third leg attachment portion 330 and the second leg attachment portion 320 which constitute plural leg attachment portions which are configured to be provided on the left connecting member 300L, and the connecting member 300 includes the first leg attachment portion 310 and the third leg attachment portion 330 which constitutes plural attachment portions which are configured to be provided on the right connecting member 300R.

One penetrating hole portion 60-1 is provided in the front upper attachment surface 381 of the left connecting member 300L. One penetrating hole portion 60-2 (a first hole portion) is provided in the front lower attachment surface 382 of the left connecting member 300L. In addition, two hole portions 60-3, 60-4 are provided in the back upper attachment surface 383 of the left connecting member 300L in such a manner as to be aligned side by side in a horizontal direction (lateral direction). One penetrating hole portion 60-5 (a second hole portion) is provided in the back lower attachment surface 384 of the left connecting member 300L.

Two penetrating hole portions 60-6, 60-7 are disposed in the front upper attachment surface 381 of the right connecting member 300R in such a manner as to be offset from each other in the horizontal direction and the upper-lower direction UL. One penetrating hole portion 60-8 (a first hole portion) is provided in the front lower attachment surface 382 of the right connecting member 300R. One penetrating hole portion 60-9 is provided in the back upper attachment surface 383 of the right connecting member 300R. One penetrating hole portion 60-10 (a second hole portion) is provided in the back lower attachment surface 384 of the right connecting member 300R. The hole portions 60-1 to 60-10 constitute engagement portions 60. The engagement portions 60 include first engagement portions 61 having the hole portions 60-1, 60-2 of the left connecting member 300L and the hole portions 60-6, 60-7, 60-8 of the right connecting member 300R and second engagement portions 62 having the hole portions 60-3, 60-4, 60-5 of the left connecting member 300L and the hole portions 60-9, 60-10 of the right connecting member 300R.

Figure 5:
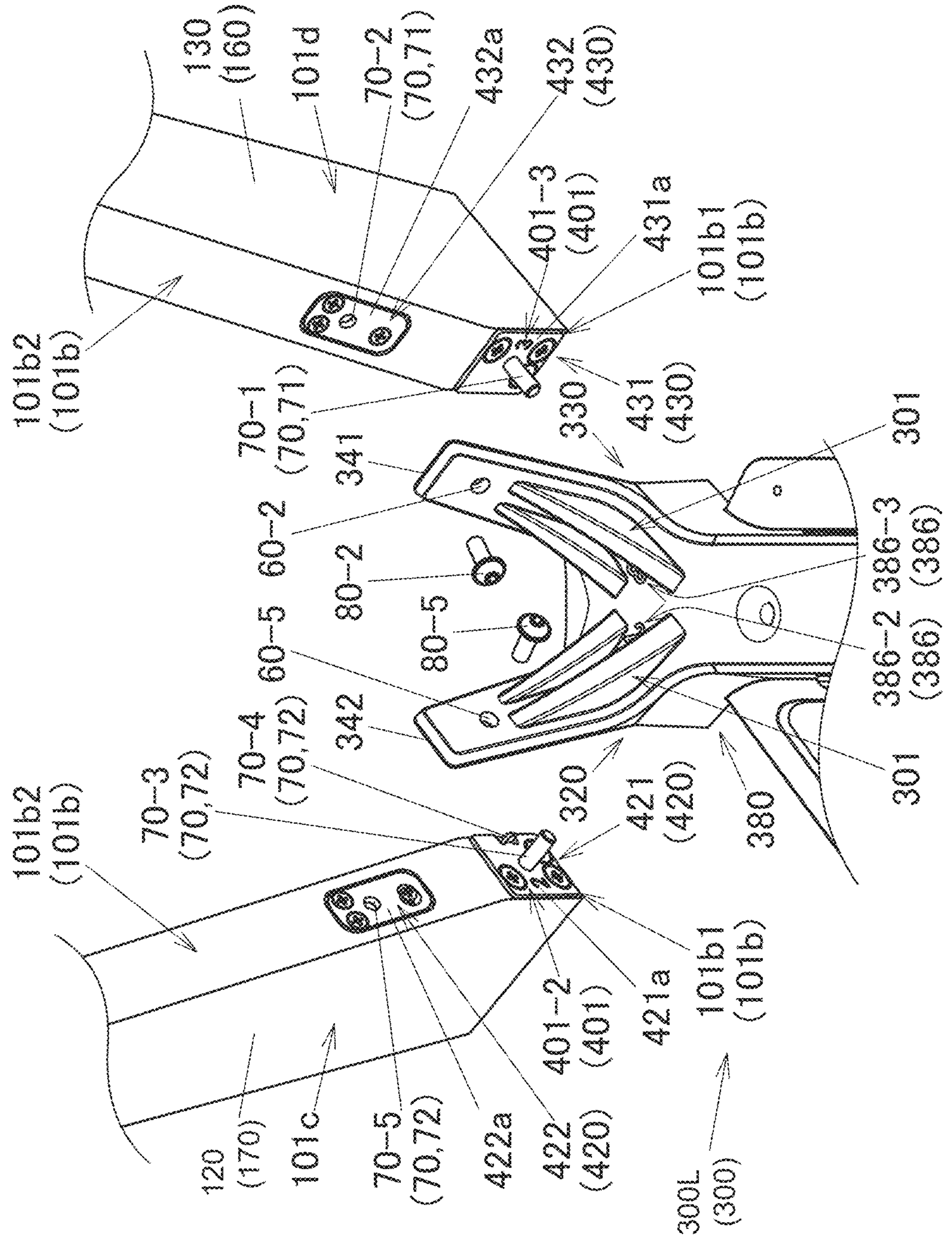
FIG. 5 is an exploded perspective view of the left connecting member and leg members of the stand according to the embodiment of the present disclosure.
Figure 6:
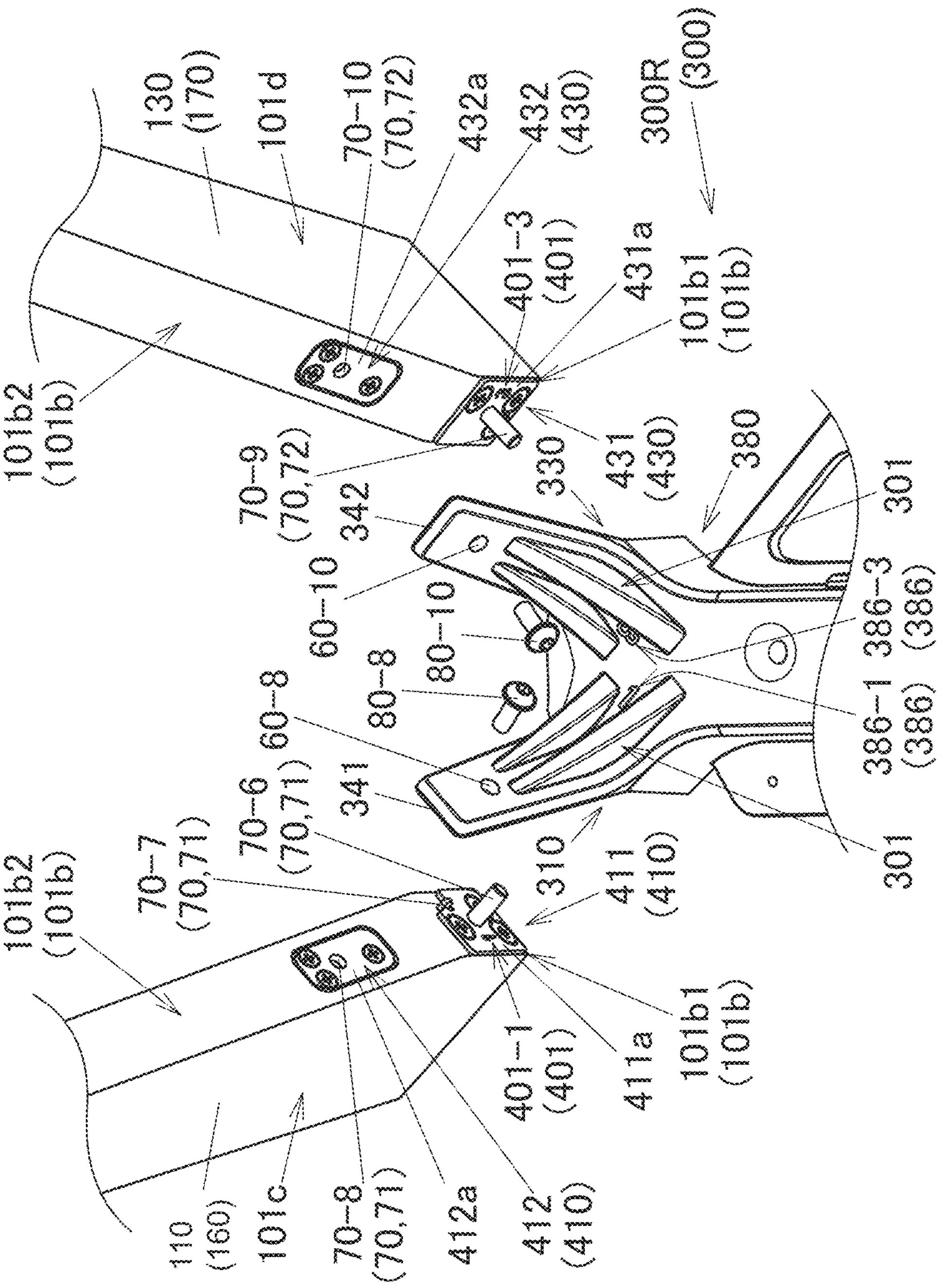
FIG. 6 is an exploded perspective view of the right connecting member and leg members of the stand according to the embodiment of the present disclosure.

In addition, as shown in FIGS. 5 and 6, two reinforcement ribs 301 are provided for each of the extended portions 341, 342 of the connecting member 300 in such a manner as to extend downwards from a lower surface of the polygonal portion 380 to the extended portion 341 or 342. An indicator portion 386 where to indicate a character (a number) provided for each of the leg attachment portions on the lower surface of the polygonal portion 380 by a marking die is provided between the two reinforcement ribs 301 for each of the extended portions 341, 342. An indicator portion 386 for the third leg attachment portion 330 includes an indicator portion 386-3 indicating a number "3", an indicator portion 386 for the second leg attachment portion 320 includes an indicator portion 386-2 indicating a number "2", and an indicator portion 386 for the first leg attachment portion 310 includes an indicator portion 386-1 indicating a number "1".

Figures 7A, 7B:
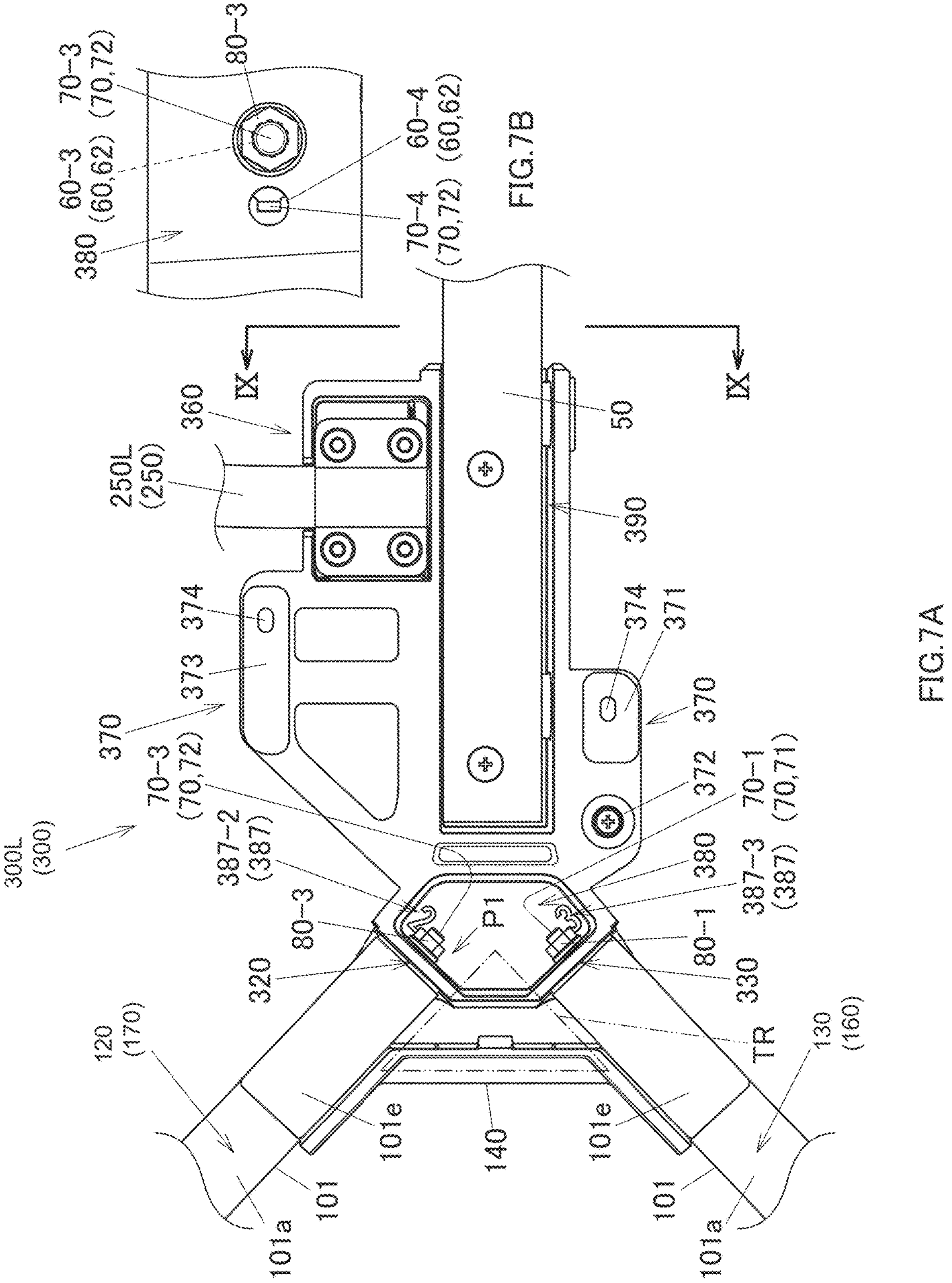
FIG. 7A is a plan view of a circumference of the left connecting member of the stand according to the embodiment of the present disclosure, as viewed directly from above.
FIG. 7B is a view as viewed from a direction P1 shown in FIG. 7A.
Figure 8A:
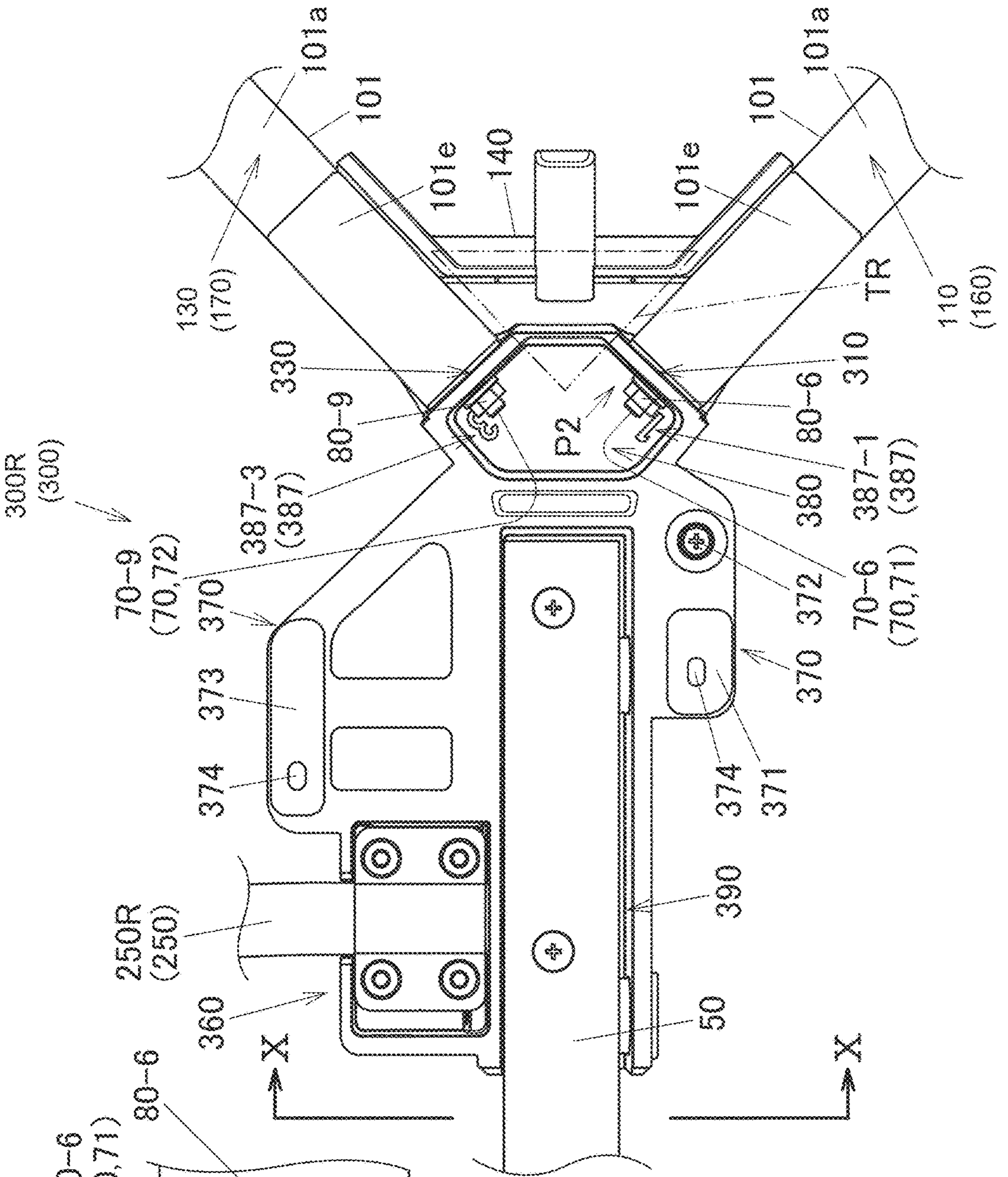
FIG. 8A is a plan view of a circumference of the right connecting member of the stand according to the embodiment of the present disclosure, as viewed directly from above.

In addition, as shown in FIGS. 7A and 8A, an indicator portion 387 is also provided for each of the leg attachment portions on an upper surface of a bottom plate of the polygonal portion 380 of the connecting member 300. As shown in FIG. 7A, in the polygonal portion 380 of the left connecting member 300L, an indicator portion 387 for the third leg attachment portion 330 includes an indicator portion 387-3 indicating a character (a number) "3", and an indicator portion 387 for the second leg attachment portion 320 includes an indicator portion 387-2 indicating a character (a number) "2". In the right connecting member 300R shown in FIG. 8A, an indicator 387 for the third leg attachment portion 330 includes an indicator portion 387-3 indicating a character (a number) "3", and an indicator portion 387 for the first leg attachment portion 310 includes an indicator 387-1 indicating a character (a number) "1".

As shown in FIGS. 1 and 2, the plural leg members 100 (the first leg member 110, the second leg member 120, and the two third leg members 130) including the front leg members 160 and the back leg members 170 each include a leg main body 101 which is made up of a wood member. The leg members 100 (the leg main bodies 101) are configured to be provided on the connecting members 300 in such a manner as to expand gradually outwards as extending gradually downwards as viewed not only in the front-back direction FB but also in the left-right direction LR. The leg main body 101 has a rectangular horizontal cross section and includes an outer surface 101*a* and an inner surface 101*b* which correspond individually to two short sides of the rectangular cross section, and a first side surface 101*c* and a second side surface 101*d* which correspond individually to two long sides of the rectangular cross section. In addition, the leg main body 101 includes a top surface 101*e* and a bottom surface 101*f*. A setting member 102, which is configured to be brought into abutment with the setting surface such as a floor on which the keyboard instrument set 1 is set, is provided on a bottom surface 101*f* of each of the second leg member 120 and the third leg members 130. A leg adjustment member 103, which is configured to move towards and away from the setting surface by means of a screw construction or the like, is provided on a bottom surface 101*f* of the first leg member 101, which is the front leg member 160.

As shown in FIGS. 5 and 6, the inner surface 101*b* includes a vertical surface 101*b*1 which connects with the top surface 101*e* at right angles and an inclined surface 101*b*2 which connects with the vertical surface 101*b*1 and inclines towards the lower side Lo. A sectional area of the leg main body 101 is caused to decrease gradually by the inclined surface 101*b*2 of the inner surface 101*b* and the outer surface 101*a* which inclines.

A third attachment portion 430 is provided on the inner surface 101*b* of the third leg member 130 shown in FIG. 5. An upper third attachment portion 431 (an upper leg attachment surface) is provided on the vertical surface 101*b*1, and a lower third attachment portion 432 (a lower leg attachment surface) is provided on the inclined surface 101*b*2.

A metallic plate 431*a*, which is configured to be fixed with a screw member, is provided on the upper third attachment portion 431. In addition, an externally threaded portion 70-1 is provided on the upper third attachment portion 431 in such a manner as to rise upright from the metallic plate 431*a*. An indicator portion 401 indicating a character (a number) marked by a marking die, that is, an indicator portion 401-3 indicating a number "3" marked by the marking die is provided on the metallic plate 431*a*.

A metallic plate 432*a*, which is configured to be fixed to the inclined surface 101*b*2 with a screw member, is provided on the lower third attachment portion 432. In addition, an internally threaded portion 70-2 (a first internally threaded portion) is provided in the metallic plate 432*a* on the lower third attachment portion 432.

As with the third leg member 130 shown in FIG. 6, an externally threaded portion 70-9 is provided on an upper third attachment portion 431 in such a manner as to rise upright from a metallic plate 431*a*, and an internally threaded portion 70-10 (a second internally threaded portion) is provided in a metallic plate 432*a* on a lower third attachment portion 432.

A second attachment portion 420 is provided on the inner surface 101*b* of the second leg member 120 shown in FIG. 5. An upper second attachment portion 421 (an upper leg attachment surface) is provided on the vertical surface

101*b*1, and a lower second attachment portion 422 (a lower leg attachment surface) is provided on the inclined surface 101*b*2.

A metallic plate 421*a*, which is configured to be fixed with a screw member, is provided on the upper second attachment portion 421. In addition, an externally threaded portion 70-3 is provided on the upper second attachment portion 421 in such a manner as to rise upright from the metallic plate 421*a*. An indicator portion 401 indicating a character (a number) marked by a marking die, that is, an indicator portion 401-2 indicating a number "2" marked by the marking die is provided on the metallic plate 421*a*. A projecting portion 70-4, which is set upright by bending a part of the metallic plate 421*a*, is provided on the upper second attachment portion 421.

A metallic plate 422*a*, which is configured to be fixed to the inclined surface 101*b*2 with a screw member, is provided on the lower second attachment portion 422. An internally threaded portion 70-5 (a second internally threaded portion) is provided in the metallic plate 422*a* on the lower second attachment portion 422.

A first attachment portion 410 is provided on the inner surface 101*b* of the first leg member 110 shown in FIG. 6. An upper first attachment portion 411 (an upper leg attachment surface) is provided on the vertical surface 101*b*1, and a lower first attachment portion 412 (a lower leg attachment surface) is provided on the inclined surface 101*b*2.

A metallic plate 411*a*, which is configured to be fixed with a screw member, is provided on the upper first attachment portion 411. An externally threaded portion 70-6 is provided on the upper first attachment portion 411 in such a manner as to rise upright from the metallic plate 411*a*. An indicator portion 401 indicating a character (a number) marked by a marking die, that is, an indicator portion 401-1 indicating a number "1" marked by the marking die is provided on the metallic plate 411*a*. A projecting portion 70-7, which is set upright by bending a part of the metallic plate 411*a*, is provided on the upper first attachment portion 411.

A metallic plate 412*a*, which is configured to be fixed to the inclined surface 101*b*2 with a screw member, is provided on the lower first attachment portion 412. An internally threaded portion 70-8 (a first internally threaded portion) is provided in the metallic plate 412*a* on the lower first attachment portion 412.

The externally threaded portions 70-1, 70-3, 70-6, 70-9 and the projecting portions 70-4, 70-7 and the internally threaded portions 70-2, 70-5, 70-8, 70-10 which are shown in FIGS. 5 and 6 constitute engagement target portions 70 configured to be brought into engagement with the engagement portions 60 (the hole portions 60-1 to 60-10). The engagement target portions 70 include first engagement target portions 71 and second engagement target portions 72. The front leg member 160 includes the first engagement target portion 71 configured to be brought into engagement with the first engagement portion 61. The back leg member 170 includes the second engagement target portion 72 configured to be brought into engagement with the second engagement portion 62. The stand 20 includes combinations of leg attachment portions (the first leg attachment portion 310, the second leg attachment portion 320, the third leg attachment portion 330) and attachment portions (the first attachment portion 410, the second attachment portion 420, the third attachment portion 430) in which the engagement constructions of the engagement portions 60 and the engagement target portions 70 are different. In other words, the stand 20 has a first engagement construction in which the first engagement target portions 71 are brought into engagement with the first engagement portions 61 and a second engagement construction in which the second engagement target portions 72 are brought into engagement with the second engagement portions 62. Then, the first engagement construction and the second engagement construction are different from each other.

Figure 8B:
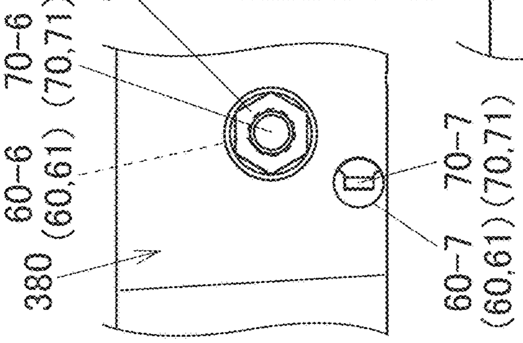
FIG. 8B is a view as viewed from a direction P2 shown in FIG. 8A.

Specifically speaking, the externally threaded portion 70-6 of the first attachment portion 410 of the first leg member 110 shown in FIG. 6 is inserted in the hole portion 60-6 in the first leg attachment portion 310 of the right connecting member 300R shown in FIG. 4 for engagement. Then, as shown in FIG. 8B which is a view as viewed from the direction of an arrow P2 in FIG. 8A, a nut 80-6 is screwed onto the externally threaded portion 70-6, whereby the externally threaded portion 70-6 is fixed in place. In addition, an engagement (concavo-convex) construction is provided for an engagement between the projecting portion 70-7 and the hole portion 60-7. In this engagement construction, the projecting portion 70-7 on the first leg member 110 shown in FIG. 6 is inserted in the hole portion 60-7 in the first leg attachment portion 310 of the right connecting member 300R shown in FIG. 4 for engagement (refer to FIG. 8B).

Figure 10:
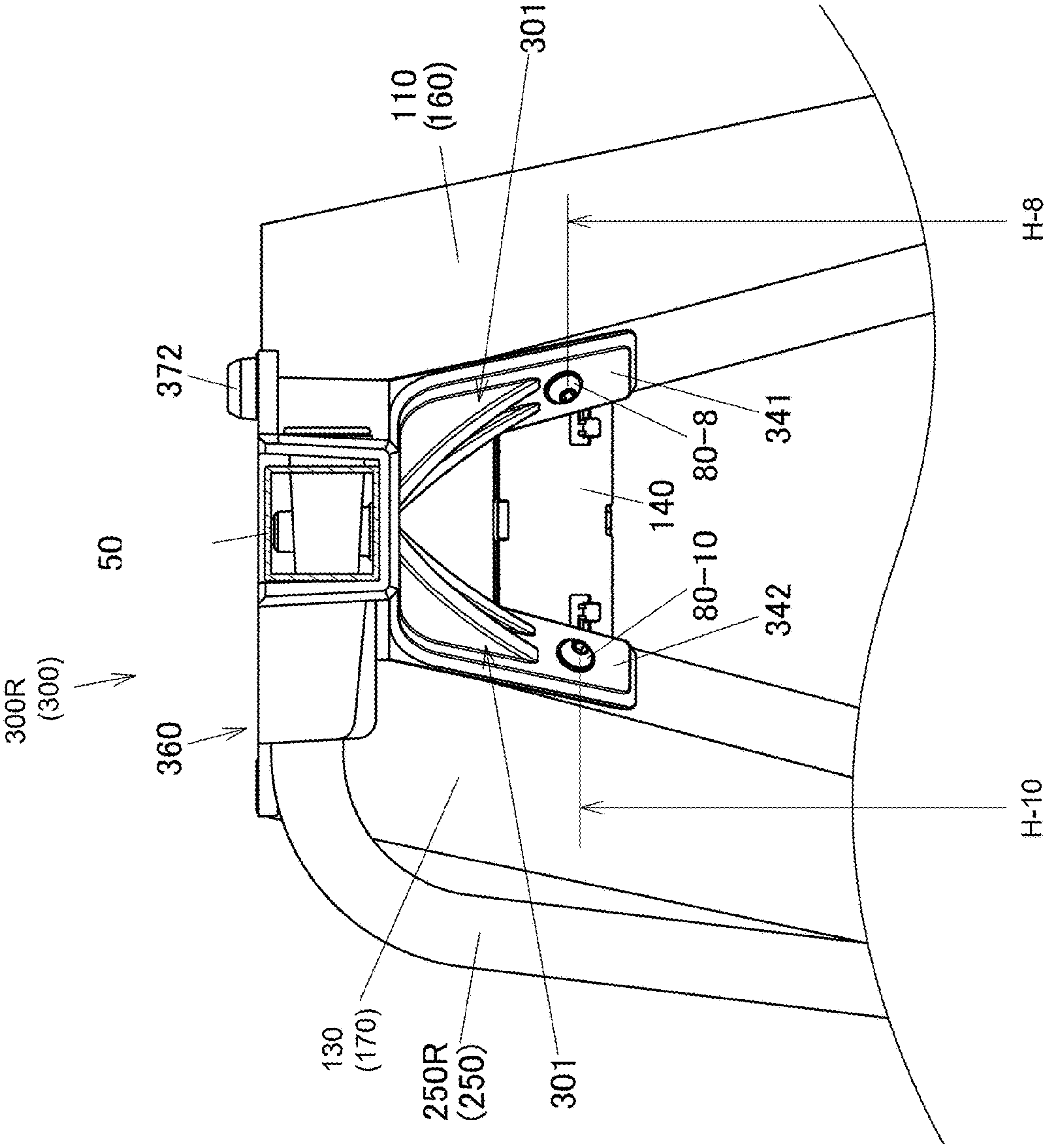
FIG. 10 is a sectional view of the stand according to the embodiment of the present disclosure taken along a line X-X in FIG. 8A.

In addition, the internally threaded portion 70-8 in the first attachment portion 410 of the first leg member 110 shown in FIG. 6 matches the hole portion 60-8 in the first leg attachment portion 310 in the right connecting member 300R in position for engagement therewith and is then fixed together with the hole portion 60-8 by a screw member 80-8 (refer to FIGS. 4 and 10, too).

The externally threaded portion 70-3 in the second attachment portion 420 of the second leg member 120 shown in FIG. 5 is inserted in the hole portion 60-3 in the second leg attachment portion 320 on the left connecting member 300L shown in FIG. 3 for engagement therewith. Then, as shown in FIG. 7B, which is a view as viewed from the direction of an arrow P1 in FIG. 7A, a nut 80-3 is screwed onto the externally threaded portion 70-3, whereby the externally threaded portion 70-3 is fixed in place. Additionally, an engagement t construction is provided for an engagement between the projecting portion 70-4 on the second leg member 120 shown in FIG. 5 and the hole portion 60-4 in the second leg attachment portion 320 of the left connecting member 300L shown in FIG. 3. In this engagement construction, the projecting portion 70-4 is inserted in the hole portion 60-4 for engagement therewith (refer to FIG. 7B).

Figure 9:
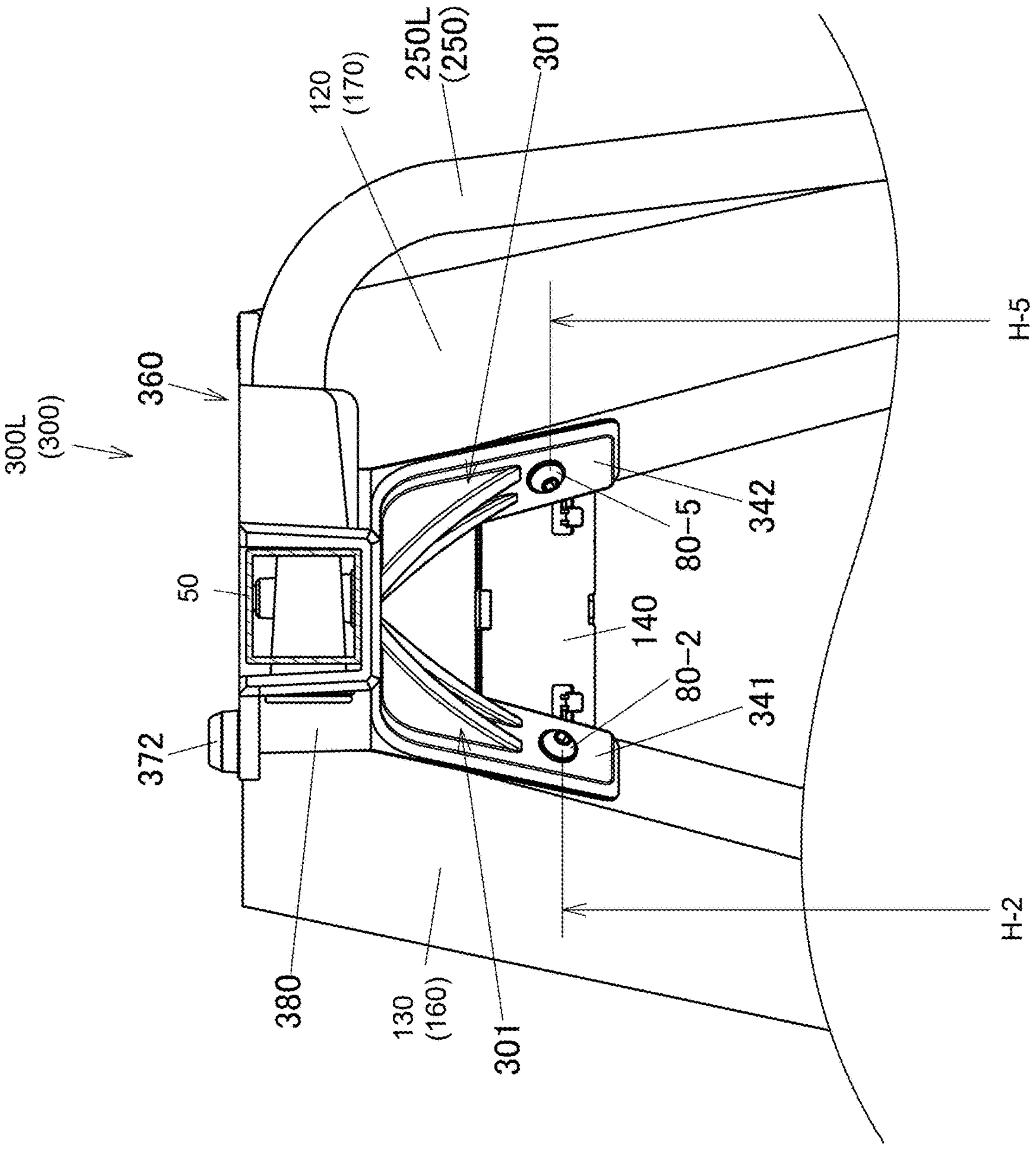
FIG. 9 is a sectional view of the stand according to the embodiment of the present disclosure taken along a line IX-IX in FIG. 7A.

The internally threaded portion 70-5 in the second attachment portion 420 of the second leg member 120 shown in FIG. 5 matches the hole portion 60-5 in the second leg attachment portion 320 in the left connecting member 300L in position for engagement therewith and is then fixed together with the hole portion 60-5 by a screw member 80-5 (a second screw member) (refer to FIGS. 3 and 9, too).

The externally threaded portion 70-1 on the third attachment portion 430 of the third leg member 130 shown in FIG. 5 is inserted in the hole portion 60-1 in the third leg attachment portion 330 of the left connecting member 300L shown in FIG. 3 for engagement therewith. Then, as shown in FIG. 7A, a nut 80-1 is screwed onto the externally threaded portion 70-1, whereby the externally threaded portion 70-1 is fixed in place.

The internally threaded portion 70-2 in the third attachment portion 430 of the third leg member 130 shown in FIG. 5 matches the hole portion 60-2 in the third leg attachment portion 330 of the left connecting member 300L in position for engagement therewith and is then fixed together with the hole portion 60-2 by a screw member 80-2 (a first screw member) (refer to FIGS. 3 and 9, too).

On the other hand, also in the right connecting member 300R shown in FIG. 6, the externally threaded portion 70-9 of the third leg member 130 is inserted in the hole portion 60-9 in the third leg attachment portion 330 shown in FIG. 4 for engagement therewith and is fixed in place by a nut 80-9 shown in FIG. 8A.

The internally threaded portion 70-10 in the third leg member 130 shown in FIG. 6 matches the hole portion 60-10 in position for engagement therewith and is fixed in place by a screw member 80-10 (a second screw member) (refer to FIGS. 4 and 10, too).

When the leg members 100 are attached to the connecting members 300, the metallic plates 411*a*, 421*a*, 431*a* on the upper leg attachment surfaces are brought into surface abutment with the front upper attachment surfaces 381 and the back upper attachment surfaces 383, and the inclined surfaces 101*b*2 including the metallic plates 412*a*, 422*a*, 432*a* on the lower leg attachment surfaces are brought into surface attachment with the front lower attachment surfaces 382 and the back lower attachment surfaces 384.

Here, nominal diameters of the externally threaded portions 70-1, 70-3, 70-6, 70-9 are the same. Similarly, nominal diameters of the internally threaded portions 70-2, 70-5, 70-8, 70-10 are the same. Thus, the nuts 80-1, 80-3, 80-6, 80-9 are nuts produced to the same specification, and the screw members 80-2, 80-5, 80-8, 80-10 are screw members produced to the same specification. Further, diameters of the hole portions 60-1 to 60-10 are substantially the same.

An inter-pitch distance between the externally threaded portion 70-1 and the internally threaded portion 70-2 of the third leg member 130 shown in FIG. 5 (that is, an inter-pitch distance between the hole portion 60-1 and the hole portion 60-2, which correspond respectively to the externally threaded portion 70-1 and the internally threaded portion 70-2, in the left connecting member 300L shown in FIG. 3) is the same as an inter-pitch distance between the external threaded portion 70-9 and the internally threaded portion 70-10 of the third leg member 130 shown in FIG. 6 (that is, an inter-pitch distance between the hole portion 60-9 and the hole portion 60-10, which correspond respectively to the external threaded portion 70-9 and the internally threaded portion 70-10, in the right connecting member 300R shown in FIG. 4).

Thus, the two third leg members 130 can both be attached to the third leg attachment portion 330 of the left connecting member 300L or the third leg attachment portion 330 of the right connecting member 300R. In other words, the engagement construction of the engagement portions 60 (the hole portions 60-1, 60-2) of the third leg attachment portion 330 of the left connecting member 300L and the engagement target portions 70 (the externally threaded portion 70-1, the internally threaded portion 70-2) of the third attachment portion 430 of the third leg member 130 configured to be attached to the left connecting member 300L is the same as the engagement construction of the engagement portions (the hole portions 60-9, 60-10) of the third leg attachment portion 330 of the right connecting member 300R and the engagement target portions 70 (the externally threaded portion 70-9, the internally threaded portion 70-10) of the third attachment portion 430 of the third leg member 130 configured to be attached to the right connecting member 300R. As a result, the combinations of the third leg attachment portions 330 of the left connecting member 300L and the right connecting member 300R and the third attachment portions 430 of the two third leg members 130 are the same in engagement construction of the engagement portions 60 and the engagement target portions 70.

On the other hand, an inter-pitch distance between the externally threaded portion 70-6 and the internally threaded portion 70-8 of the first leg member 110 shown in FIG. 6 (that is, an inter-pitch distance between the hole portion 60-6 and the hole portion 60-8 in the right connecting member 300R shown in FIG. 4) is different from an inter-pitch distance between the external threaded portion 70-1 and the internally threaded portion 70-2 of the third leg member 130 and between the external threaded portion 70-9 and the internally threaded portion 70-10 of the third leg member 130 shown in FIGS. 5 and 6 (that is, an inter-pitch distance between the hole portion 60-1 and the hole portion 60-2 shown in FIG. 3 and between the hole portion 60-9 and the hole portion 60-10 shown in FIG. 4).

Similarly, an inter-pitch distance between the externally threaded portion 70-3 and the internally threaded portion 70-5 of the second leg member 120 shown in FIG. 5 (that is, an inter-pitch distance between the hole portion 60-1 and the hole portion 60-2 in the left connecting member 300L shown in FIG. 3) is different from an inter-pitch distance between the external threaded portion 70-1 and the internally threaded portion 70-2 of the third leg member 130 and between the external threaded portion 70-9 and the internally threaded portion 70-10 of the third leg member 130 shown in FIGS. 5 and 6 (that is, an inter-pitch distance between the hole portion 60-1 and the hole portion 60-2 shown in FIG. 3 and between the hole portion 60-9 and the hole portion 60-10 shown in FIG. 4).

The inter-pitch distance between the externally threaded portion 70-6 and the internally threaded portion 70-8 of the first leg member 110 shown in FIG. 6 (that is, the inter-pitch distance between the hole portion 60-6 and the hole portion 60-8 in the right connecting member 300R shown in FIG. 4) is the same as the inter-pitch distance between the externally threaded portion 70-3 and the internally threaded portion 70-5 of the second leg member 120 shown in FIG. 5 (that is, the inter-pitch distance between the hole portion 60-1 and the hole portion 60-2 of the left connecting member 300L shown in FIG. 3).

On the other hand, as shown in FIG. 7B which is the view as viewed from the direction of the arrow P1 in FIG. 7A, the projecting portion 70-4 (the hole portion 60-4) is positioned horizontally adjacent to the externally threaded portion 70-3 of the second leg member 120. As shown in FIG. 8B which is the view as viewed from the direction of the arrow P2 in FIG. 8A, the projecting portion 70-7 (the hole portion 60-7) is positioned at the lower side Lo as a result of being offset horizontally and vertically from the externally threaded portion 70-6 of the first leg member 110. As a result, the positional relationship between the externally threaded portion 70-3 and the projecting portion 70-4 differs from the positional relationship between the externally threaded portion 70-6 and the projecting portion 70-7.

That is, the engagement construction between the engagement portions 60 (the hole portions 60-6, 60-7, 60-8) of the first leg attachment portion 310 of the right connecting member 300R and the engagement target portions 70 (the externally threaded portion 70-6, the internally threaded portion 70-8, the projecting portion 70-7) of the first attachment portion 410 of the first leg member 110 differs from the engagement construction between the engagement portions 60 (the hole portions 60-3, 60-4, 60-5) of the second leg attachment portion 320 of the left connecting member 300L and the engagement target portions 70 (the externally threaded portion 70-3, the internally threaded portion 70-5, the projecting portion 70-4) of the second attachment portion 420 of the second leg member 120.

To summarize what has been described heretofore, the engagement construction between the engagement portions 60 and the engagement target portions 70 based on the combination of the first leg attachment portion 310 and the first attachment portion 410, the engagement construction between the engagement portions 60 and the engagement target portions 70 based on the combination of the second leg attachment portion 320 and the second attachment portion 420, and the engagement construction between the engagement portions 60 and the engagement target portions 70 based on the combination of the third leg attachment portion 330 and the third attachment portion 430 are all different from one another. Then, the indicator portions 386 and 387 indicate the different engagement constructions accordingly.

In other words, in the left connecting member 300L, the front leg member 160 (the third leg member 130), and the back leg member 170 (the second leg member 120), the inter-pitch distance between the hole portions 60-1 and 60-2 of the first engagement portion 61 on the front side F (the inter-pitch distance between the externally threaded portion 70-1 and the internally threaded portion 70-2 of the first engagement target portion 71 of the front leg member 160) differs from the inter-pitch distance between the hole portions 60-3 and 60-5 of the second engagement portion 62 on the back side B (the inter-pitch distance between the externally threaded portion 70-3 and the internally threaded portion 70-5 of the second engagement target portion 72 of the back leg member 170). In addition, although the engagement between the hole portion 60-4 and the projecting portion 70-4 is adopted for the engagement between the left connecting member 300L and the back leg member 170 (the second leg member 120), the engagement is not adopted for the engagement between the left connecting member 300L and the front leg member 160 (the second leg member 120). As a result, in the left connecting member 300L, the front leg member 160 (the third leg member 130), and the back leg member 170 (the second leg member 120), the first engagement construction in which the first engagement target 71 portion is brought into engagement with the first engagement portion 61 differs from the second engagement construction in which the second engagement target portion 72 is brought into engagement with the second engagement portion 62.

Similarly, in the right connecting member 300R, the front leg member 160 (the first leg member 110), and the back leg member 170 (the third leg member 130), the inter-pitch distance between the hole portions 60-6 and 60-8 of the first engagement portion 61 on the front side F (the inter-pitch distance between the externally threaded portion 70-1 and the internally threaded portion 70-6 of the first engagement target portion 71 of the front leg member 160) differs from the inter-pitch distance between the hole portions 60-9 and 60-10 of the second engagement portion 62 on the back side B (the inter-pitch distance between the externally threaded portion 70-9 and the internally threaded portion 70-10 of the second engagement target portion 72 of the back leg member 170). In addition, although the engagement between the hole portion 60-7 and the projecting portion 70-7 is adopted for the engagement between the right connecting member 300R and the front leg member 160 (the first leg member 110), the engagement is not adopted for the engagement between the right connecting member 300R and the back leg member 170 (the third leg member 130). As a result, in the right connecting member 300R, the front leg member 160 (the first leg member 110), and the back leg member 170 (the third leg member 130), the first engagement construction in which the first engagement target portion 71 is brought into engagement with the first engagement portion 61 differs from the second engagement construction in which the second engagement target portion 72 is brought into engagement with the second engagement portion 62.

Then, the indicator portions 386, 387, 401 are provided individually for the left connecting member 300L and the right connecting member 300R, and individually for the front leg members 160 and the back leg members 170 which are configured to be attached to the left connecting member 300L and the right connecting member 300R in such a manner as to discriminate the first engagement construction from the second engagement construction. For a discriminative indication of the first engagement construction and the second engagement construction, in addition to those described in the present embodiment, for example, an indication can also be adopted which includes an assembling order of the constituent leg members 100.

For the relationships between the externally threaded portion 70-1 and the like and the internally threaded portion 70-2 and the like, the following relationship can also be adopted. Heights of the externally threaded portions 70-1, 70-9, 70-3, 70-6 (the hole portions 60-1, 60-9, 60-3, 60-6) from the setting surface (setting surface heights) are the same. However, as shown in FIG. 9, a setting surface height H-2 of the screw member 82-2 (the internally threaded portion 70-2, the hole portion 60-2) is lower than a setting surface height H-5 of the screw member 80-5 (the internally threaded portion 70-5, the hole portion 60-5). Similarly, as shown in FIG. 10, a setting surface height H-8 of the screw member 80-8 (the internally threaded portion 70-8, the hole portion 60-8) is higher than a setting surface height of the screw member 80-10 (the internally threaded portion 70-10, the hole portion 60-10). Here, the setting surface height H-5 of the screw member 80-5 (the internally threaded portion 70-5, the hole portion 60-5) is the same as the setting surface height H-8 of the screw member 80-8 (the internally threaded portion 70-8, the hole portion 60-8). The setting surface heights H-2, H-10 of the third leg members 130 (the third attachment portion 430, the third leg attachment portion 330) are the same.

Here, in the event that the first leg member 110 and the second leg member 120 are attempted to be attached to the third leg attachment portion 330, since the engagement portions 60 (the hole portions) corresponding to the projecting portions 70-7, 70-4 of the first leg member 110 and the second leg member 120 do not exist in the front upper attachment surface 381 and the back upper attachment surface 383, the projecting portions 70-7, 70-4 are brought into abutment with the front upper attachment surface 381 and the back upper attachment surface 383 but are not brought into engagement therewith. As a result, the first leg member 110 and the second leg member 120 cannot be attached to the third leg attachment portion 330.

In addition, in the event that the third leg members 130 are attempted to be attached to the first leg attachment portion 310 and the second leg attachment portion 320, although the externally threaded portions 70-1, 70-9 can be inserted in the hole portions 60-3, 60-6, the hole portions 60-5, 60-8 differ in position from the internally threaded portions 70-2, 70-10, and hence, the hole portions 60-5, 60-8 do not match the internally threaded portions 70-2, 70-10, whereby the hole portions 60-5, 60-8 are not brought into engagement with the internally threaded portions 70-2, 70-10. Thus, the third leg members 130 cannot be attached to the first leg attachment portion 310 and the second leg attachment portion 320.

Further, even in the event that the first leg member 110 is attempted to be attached to the second leg attachment portion 320 or the second leg member 120 is attempted to be attached to the first leg attachment portion 310, the hole portions 60-4, 60-7 corresponding to the projecting portions 70-4, 70-7 are different in position on the relevant leg attachment portions 310, 320, whereby the first leg member 110 cannot be attached to the second leg attachment portion 320 or the second leg member 120 cannot be attached to the first leg attachment portion 310.

In addition, as described before, the angle brace member 140 is provided between the front leg member 160 (the third leg member 130 on the front side F, the first leg member 110) and the back leg member 170 (the second leg member 120, the third leg member 130 on the back side B) in such a manner as to span the space defined therebetween. Since a truss construction TR is defined by the first leg member 160, the back leg member 170, and the angle brace member 140 (refer to FIGS. 7A, 8A), forces that are applied to the stand 20 from the front-back direction FB and the left-right direction LR can be dealt with properly. Since the angle brace member 140 is attached to the front leg member 160 and the back leg member 170 in such a manner as to span the space defined therebetween, the positions on the connecting member 300 where those leg members 100 are attached are determined in advance.

In the stand 20, the setting adjustment members 211 are provide on the pedal device 200. Here, the pedal device 200 is disposed on the back side B of the stand 20. Thus, with the leg members 100, when the adjustment member for the setting surface is disposed on the front side F, the setting state of the keyboard instrument set 1 is easily adjusted. Then, with the stand 20 according to the present embodiment, the leg adjustment member 103 is provided on the right-front leg member 100 for use by a right-handed player. That is, the leg adjustment member 103 for adjusting the height is provided on the first leg member 110 which is one of the two front leg members 160.

Consequently, the third leg members 130, which are disposed in the left-front and right-back positions and are disposed in such a manner as to face each other obliquely, may be replaced by each other. However, when the first leg member 110 and the second leg member 120, which are disposed in the right-front and left-back positions and are disposed in such a manner as to face each other obliquely, are replaced by each other for attachment, the problem is caused. In addition, depending upon a case, the stand 20 may be shipped in such a pre-assembled state that a user is requested to assemble the constituent components or members up as required into a perfect stand 20 after he or she receives it. Thus, as with the stand 20 according to the present embodiment, a risk of erroneous attachments of the leg members 100 is reduced by including the combinations of the leg attachment portions and the attachment portions in which the engagement constructions of the engagement portions 60 and the engagement target portions 70 are different. In the case that a common engagement construction is provided by eliminating the projecting portions 70-7, 70-4 of the first leg member 110 and the second leg member 120 and the hole portions 60-7, 60-4 in the connecting members 300 which are configured to be brought into engagement with the corresponding projecting portions 70-7, 70-4, the first leg member 110 and the second leg member 120 can be replaced by each other for attachment to the connecting members 300, whereby the four leg members 100 can be made into two pairs of leg members 100 having different types (two types) of engagement constructions. At this time, attaching the leg adjustment member 103 to all the four leg members 100 enables an accurate adjustment of the setting of the stand 20 on the setting surface.

Thus, with the embodiment of the present disclosure, the stand 20 includes the horizontal spanning member 50, the connecting members 300 configured to be fixed to the horizontal spanning member 50 and including the first engagement portions 61 and the second engagement portions 62, the front leg members 160 including the first engagement target portions 71 configured to brought into engagement with the first engagement portions 61, and the back leg members 170 including the second engagement target portions 72 configured to be brought into engagement with the second engagement portions 62. Then, the first engagement construction in which the first engagement target portions 71 are brought into engagement with the first engagement portions 61 is different from the second engagement construction in which the second engagement target portions 72 are brought into engagement with the second engagement portions 62.

As a result of adopting this configuration, in each of the left connecting member 300L and the right connecting member 300R, the first engagement construction in which the front leg members 160 are brought into engagement with both the connecting members 300 is different from the second engagement construction in which the back leg members 170 are brought into engagement with both the connecting members 300. Additionally, there is provided the restriction in which only the predetermined leg members are allowed to be attached to the leg attachment portions of the connecting members 300. As a result, even in the event that the stand 20 is shipped in such a pre-assembled state that a user is requested to assemble the constituent components or members up as required into a perfect stand 20 after he or she receives it, the user can be freed from any erroneous assembling work of the stand 20.

The stand 20 includes the angle brace members 140 which are each provided between the front leg member 160 and the back leg member 170 in such a manner as to span the space defined therebetween. As a result, the trust construction TR can be defined by the front leg member 160, the back leg member 170, and the angle brace member 140, whereby the stand 20 can be provided which has the enhanced strength.

The leg adjustment member 103 is provided on the bottom surface 101*f* of the front leg member 160 (the first leg member 110). As a result, the player can easily make an adjustment between the leg and the setting surface.

The front leg members 160 include the first internally threaded portions (the internally threaded portions 70-2, 70-8), and the back leg members 170 include the second internally threaded portions (the internally threaded portions 70-5, 70-10). Then, the connecting members 300 include the first hole portions (the hole portions 60-2, 60-8) in which the first screw members (the screw members 80-2, 80-8) which are configured to be screwed into the first internally threaded portions are inserted, and the second hole portions (the hole portions 60-5, 60-10) in which the second screw members (the screw members 80-5, 80-10) which are configured to be screwed into the second internally threaded portions are inserted. In addition, the setting surface heights H-2, H-8 of the first internally threaded portion and the first hole portion and the setting surface heights H-5, H-10 of the second internally threaded portion and the second hole portion are different. As a result, the risk of erroneous assembling can be reduced further.

The front leg members 160 and the back leg members 170 include respectively the upper leg attachment surfaces (the upper first attachment portion 411, the upper second attachment portion 421, the upper third attachment portion 431) and the lower leg attachment surfaces (the lower first attachment portion 412, the lower second attachment portion 422, the lower third attachment portion 432). Then, the connecting members 300 each include the polygonal portion 380 to which the upper leg attachment surfaces are fixed and the extended portions 341, 342 which are extended from the polygonal portion 380 and to which the lower leg attachment surfaces are fixed. As a result, the upper attachment is executed by screwing the nuts 80-1 and the like onto the externally threaded portions 70-1 and the like, while the lower attachment is executed by screwing the screw members 80-2 and the like into the corresponding internally threaded portions. Thus, the configuration can be provided which facilitates the assembling work.

The connecting members 300 and the leg members 100 include the indicator portions by which the first engagement construction and the second engagement construction can be discriminated from each other. As a result, the user can attach the leg members 100 to the connecting members 300 without any error while looking at the characters (including numbers, symbols, and characters) which are indicated on the indicator portions.

The leg members 100 which include the front leg members 160 and the back leg members 170 include the first leg member 110, the second leg member 120, and the two third leg members 130. Then, the two third leg members 130 are disposed in such a manner as to face each other obliquely, and the front leg members 160 are made up of the first leg member 110 and the front third leg member 130, while the back leg members 170 are made up of the second leg member 120 and the back third leg member 130. As a result, the stand 20 can be provided which can be built up easily by instinctively understanding the arrangement of the leg members 100.

The keyboard instrument set 1 includes the stand 20 and the keyboard instrument 10 which is configured to be attached to the stand 20. As a result, the keyboard instrument set 1 can be provided which includes the stand 20 which can easily be built up.

With the present embodiment, while the leg adjustment member 103 is provided on the bottom surface **101*f* of the first leg member 110 which constitutes the front leg member 160, instead of this configuration, the leg adjustment member 103 may be provided on at least any of the bottom surface 101*f* of the second leg member 120 and the bottom surfaces 101*f* of the two third leg members 130. Alternatively, the leg adjustment member 103 may be provided on all the bottom surfaces 101*f* of the first leg member 110 and the second leg member 120 and the bottom surfaces 101*f* of the two third leg members 130**.

With the present embodiment, while the internally threaded portions 70-2, 70-5, 70-8, 70-10 and the screw members 80-2, 80-5, 80-8, 80-10 are adopted, externally threaded portions and nuts may be adopted in place of those internally threaded portions and screw members. In this case, needless to say, the connecting members and the leg members are fixed to each other by inserting the externally threaded portions in the corresponding hole portions 60-2, 60-5, 60-8, 60-10. In addition, with the present embodiment, while the externally threaded portions 70-1, 70-3, 70-6, 70-9 and the nuts 80-1, 80-3, 80-6, 80-9 are adopted, internally threaded portions and screw members may be adopted in place of those externally threaded portions and nuts. In this case, needless to say, the connecting members and the leg members are fixed to each other with the screw members by superposing the hole portions 60-1, 60-3, 60-6, 60-9 on the corresponding internally threaded portions.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A stand comprising:

a lateral spanning member a connecting member configured to be fixed to the lateral spanning member and having a first engagement portion and a second engagement portion; and a front leg comprising a first engagement target portion configured to be brought into engagement with the first engagement portion and a back leg comprising a second engagement target portion configured to be brought into engagement with the second engagement portion, wherein a first engagement assembly in which the first engagement target portion is brought into engagement with the first engagement portion and a second engagement assembly in which the second engagement target portion is brought into engagement with the second engagement portion are different from each other.

2. The stand according to claim 1, comprising:

a brace configured to fit between the front leg and the back leg and span a space defined therebetween.

3. The stand according to claim 1, wherein a leg adjustment member is provided on at least one of a bottom surface of the front leg and a bottom surface of the back leg.

4. The stand according to claim 1, wherein the front leg comprises a first internally threaded portion, and the back leg comprises a second internally threaded portion, wherein the connecting member comprises a first hole portion in which a first screw configured to be screwed into the first internally threaded portion is inserted and a second hole portion in which a second screw configured to be screwed into the second internally threaded portion is inserted, and wherein a height of the first internally threaded portion from a setting surface and a height of the second internally threaded portion from the setting surface are different from each other.

5. The stand according to claim 1, wherein the front leg comprises a first externally threaded portion, and the back leg comprises a second externally threaded portion, wherein the connecting member comprises a first hole portion in which the first externally threaded portion is configured to be inserted and a second hole portion in which the second externally threaded portion is configured to be inserted, and wherein a height of the first externally threaded portion from a setting surface and a height of the second externally threaded portion from the setting surface are different from each other.

6. The stand according to claim 1, wherein the front leg and the back leg each comprise an upper leg attachment surface and a lower leg attachment surface, and wherein the connecting member comprises an upper leg attachment portion to which the upper leg attachment surface is configured to be fixed and an extended portion extended from the upper leg attachment portion and to which the lower leg attachment surface is configured to be fixed.

7. The stand according to claim 6, wherein in one of the front leg and the back leg, a direction of a normal of an attachment surface of the upper leg attachment portion and a direction of a normal of an attachment surface of the extended portion are different from each other.

8. The stand according to claim 1, wherein the connecting member comprises a left connecting member configured to be fixed to a left side of the lateral spanning member and a right connecting member configured to be fixed to a right side of the lateral spanning member.

9. The stand according to claim 8, wherein the front leg and the back leg each comprise an upper leg attachment surface and a lower leg attachment surface, wherein one of the left connecting member and the right connecting member comprises a front upper leg attachment portion to which the upper leg attachment surface of the front leg is configured to be fixed, a front extended portion to which the lower leg attachment surface of the front leg is configured to be fixed, a back upper leg attachment surface to which the upper leg attachment surface of the back leg is configured to be fixed, and a back extended portion to which the lower leg attachment surface of the back leg is configured to be fixed, and wherein directions of normals of attachment surfaces of the front upper leg attachment portion, the front extended portion, the back upper leg attachment portion, and the back extended portion are different from one another.

10. The stand according to claim 1, wherein the connecting member comprises a first indicator portion which is a mark for assisting proper engagement of the first engagement target portion with the first engagement portion, and a second indicator portion which is a mark for assisting proper engagement of the second engagement target portion with the second engagement portion, the first indicator portion being different from the second indicator portion such that the first indicator portion and the second indicator portion can be discriminated from each other.

11. The stand according to claim 1, wherein a leg comprising the front leg and the back leg comprises a first leg, a second leg, and two third legs having an identical configuration.

12. A keyboard instrument set comprising:

the stand according to claim 1; and a keyboard instrument configured to be attached to the stand.

13. The stand according to claim 10, wherein the front leg comprises a front leg indicator portion which is a mark corresponding to the first indicator portion and the back leg comprises a back leg indicator portion which is a mark corresponding to the second indicator portion.

* * * * *